United States Patent
Farooq et al.

(10) Patent No.: US 12,452,721 B2
(45) Date of Patent: Oct. 21, 2025

(54) MINIMIZATION OF DRIVE TEST REPORT VALIDATION

(71) Applicant: Telefonaktiebolaget LM Ericsson (PUBL), Stockholm (SE)

(72) Inventors: Hasan Farooq, Santa Clara, CA (US); Julien Forgeat, San Jose, CA (US); Michael Liljenstam, Sunnyvale, CA (US); Meral Shirazipour, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 355 days.

(21) Appl. No.: 18/252,380

(22) PCT Filed: Nov. 11, 2020

(86) PCT No.: PCT/IB2020/060592
§ 371 (c)(1),
(2) Date: May 10, 2023

(87) PCT Pub. No.: WO2022/101656
PCT Pub. Date: May 19, 2022

(65) Prior Publication Data
US 2024/0015554 A1    Jan. 11, 2024

(51) Int. Cl.
*H04W 24/10*    (2009.01)
*H04W 24/02*    (2009.01)

(52) U.S. Cl.
CPC .......... *H04W 24/10* (2013.01); *H04W 24/02* (2013.01)

(58) Field of Classification Search
CPC .............................. H04W 24/10; H04W 24/02
See application file for complete search history.

(56) References Cited

U.S. PATENT DOCUMENTS 10,650,142 B1    5/2020    Chen
2014/0128057 A1*    5/2014    Siomina ................ H04W 56/00
                                                                    455/423

(Continued)

FOREIGN PATENT DOCUMENTS

WO    2019 024939 A1    2/2019

OTHER PUBLICATIONS

3GPP TSG-RAN WG2#92, Anaheim, USA, Nov. 16-20, 2015; Title: Logged MDT Under IDC Interference; Source: ZTE; Agenda item: 7.13.2 (R2-156236).

(Continued)

*Primary Examiner* — David Bilodeau
(74) *Attorney, Agent, or Firm* — Sage Patent Group

(57) ABSTRACT

According to some embodiments, a method performed by a network node for validating minimization of drive test (MDT) reports comprises: receiving a MDT report generated by a wireless device: determining to perform validation on the received MDT report: correlating the MDT report with MDT reports from one or more wireless devices in proximity to the wireless device to determine a first correlation value; determining a trust score for the MDT report based on one or more correlation values, the one or more correlation values at least comprising the first correlation value; determining whether the trust score is below a validation threshold; and upon determining the trust score is below the validation threshold, performing a corrective action with respect to the received MDT report.

22 Claims, 3 Drawing Sheets

(56) References Cited

U.S. PATENT DOCUMENTS

| | | |
|---|---|---|
| 2017/0019795 A1 | 1/2017 | Takahashi |
| 2017/0331670 A1* | 11/2017 | Parkvall ............... H04W 52/028 |
| 2019/0289433 A1 | 9/2019 | Arunkumar et al. |
| 2023/0180042 A1* | 6/2023 | Bansal .................. H04W 24/10 370/252 |
| 2023/0189315 A1* | 6/2023 | Haustein ............... H04W 24/02 370/252 |
| 2023/0189382 A1* | 6/2023 | Haustein ............... H04W 76/20 370/329 |

OTHER PUBLICATIONS

PCT International Search Report issued for International application No. PCT/IB2020/060592—Jul. 15, 2021.
PCT Written Opinion of the International Searching Authority issued for International application No. PCT/IB2020/060592—Jul. 15, 2021.
A. Imran and A. Zoha, "Challenges in 5g: how to empower son with big data for enabling 5g," Network, IEEE, vol. 28, No. 6, pp. 27-33, Nov. 2014.
O. G. Aliu, A. Imran, M. A. Imran, and B. Evans, "A Survey of Self Organisation in Future Cellular Networks," IEEE Communications Surveys & Tutorials, vol. 15, No. 1, pp. 336-361, 2013.
3GPP TS 37.320, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12)", V12.2.0, (Sep. 2014).
S. Hämäläinen, H. Sanneck, and C. Sartori, LTE Self-Organising Networks (SON): Network Management Automation for Operational Efficiency. John Wiley & Sons, 2012.
Joshua J. Drake, Pau Oliva Fora, Zach Lanier, Collin Mulliner, Stephen A. Ridley, Georg Wicherski, "Android Hacker's Handbook", John Wiley & Sons, 2014 [due to size, this reference has been split into three parts].
Gokce Gorbil, Omer Abdelrahman, Mihajlo Pavloski, Erol Gelenbe, "Modeling and Analysis of RRC-Based Signalling Storms in 3G Networks", accepted for publication in IEEE Transactions on Emerging Topics in Computing, 2015.
Collin Mulliner, Steffen Liebergeld, Matthias Lange, and Jean-Pierre Seifert, "Taming Mr Hayes: Mitigating Signaling Based Attacks on Smartphones", Proceedings of the 2012 42nd Annual IEEE/IFIP International Conference on Dependable Systems and Networks (DSN), pp. 1-12, 2012.
Ralf-Philipp Weinmann, "Baseband Attacks: Remote Exploitation of Memory Corruptions in Cellular Protocol Stacks", Proceedings of the 6th USENIX Conference on Offensive Technologies WOOT'12, 2012.
Ralf-Philipp Weinmann, "All Your Baseband Are Belong to Us", Laboratory for Algorithmics, Cryptology & Computer Security, University of Luxembourg. http://archive.hack.lu/2010/Weinmann-All-Your-Baseband-Are-Belong-To-Us-slides.pdf.
Anonymous, "Your own mobile network", srsLTE.
H. Y. Lateef, A. Imran, and A. Abu-dayya, "A framework for classification of Self-Organising network conflicts and coordination algorithms," in 2013 IEEE 24th Annual International Symposium on Personal, Indoor, and Mobile Radio Communications (PIMRC). IEEE, Sep. 2013, pp. 2898-2903.
O. Onireti, A. Zoha, J. Moysen, A. Imran, L. Giupponi, M. Imran, and A. Abu Dayya, "A cell outage management framework for dense heterogeneous networks," Vehicular Technology, IEEE Transactions on, vol. PP, No. 99, pp. 1-1, 2015.
P. V. Klaine, M. A. Imran, O. Onireti and R. D. Souza, "A Survey of Machine Learning Techniques Applied to Self-Organizing Cellular Networks," in IEEE Communications Surveys & Tutorials, vol. 19, No. 4, pp. 2392-2431, Fourthquarter 2017 [due to size, this reference has been split into two parts].
M. T. Raza, F. M. Anwar, and S. Lu, "Exposing LTE Security Weaknesses at Protocol Inter-Layer, and Inter-Radio Interactions," in International Conference on Security and Privacy in Communication Systems. Springer, 2017, pp. 312-338.

* cited by examiner

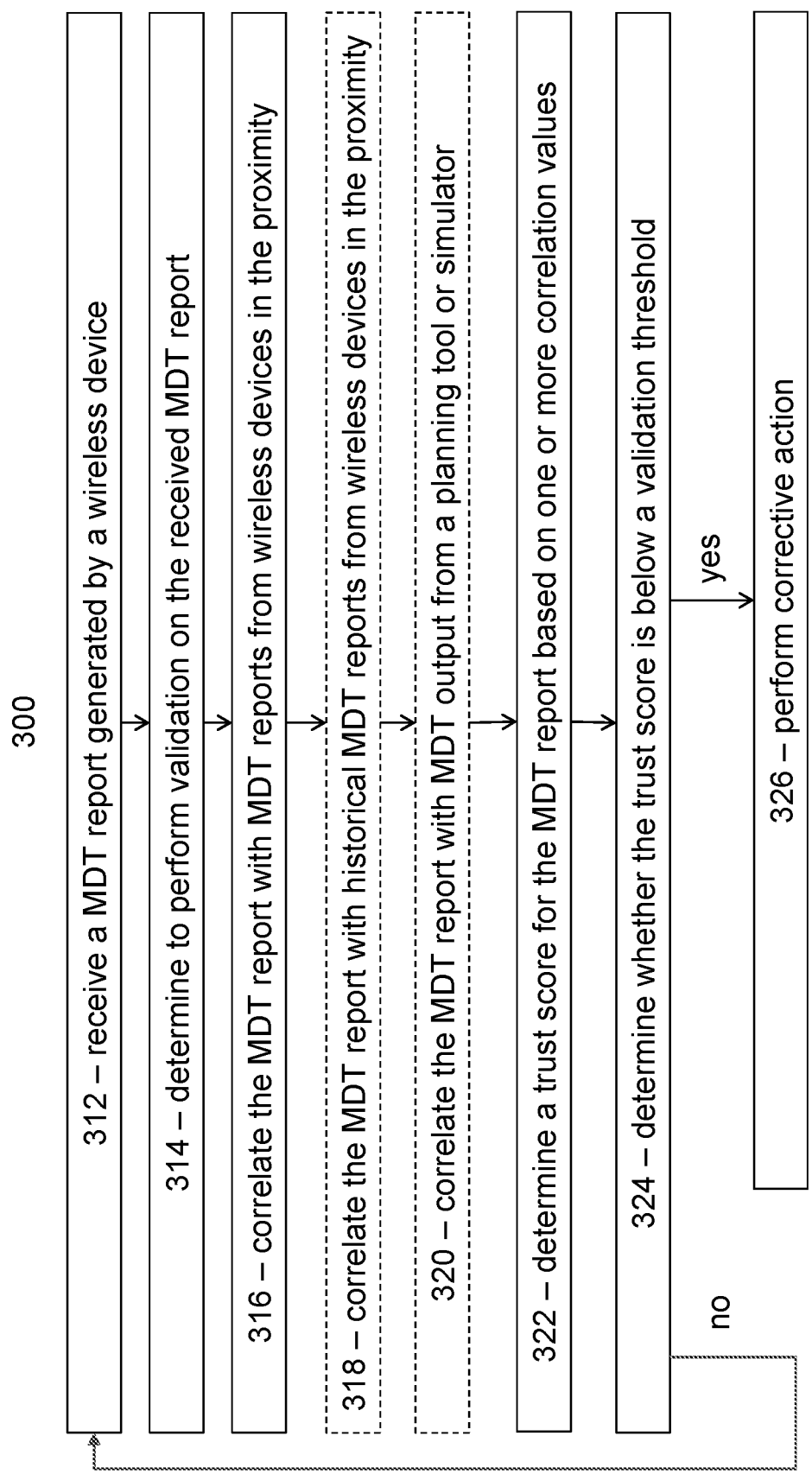

MINIMIZATION OF DRIVE TEST REPORT VALIDATION

PRIORITY

This nonprovisional application is a U.S. National Stage Filing under 35 U.S.C. § 371 of International Patent Application Serial No. PCT/IB2020/060592 filed Nov. 11, 2020 and entitled "MINIMIZATION OF DRIVE TEST REPORT VALIDATION" which is hereby incorporated by reference in its entirety.

TECHNICAL FIELD

Embodiments of the present disclosure are directed to wireless communications and, more particularly, to detecting false minimization of drive test (MDT) reports.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Changes in mobile networks have been driven by the unprecedented growth in the number of connected devices and the desire for a better mobile broadband experience. Fifth generation (5G) networks are designed to provide gigabit experience and virtually zero latency for billions of devices everywhere and anytime. Such experiences may be realized when 5G includes self-organizing network (SON) features. For example, evolved SON features for zero touch automation in 5G are expected to be game changers for the future of mobile networks. The evolved SON features leverage end-to-end network intelligence by using the cognition of context of services as well as user and network behavior.

Recognizing the importance of SON, a number of SON use cases have been standardized under the Third Generation Partnership Project (3GPP) umbrella that automate configuration, optimization and healing aspects of cellular networks with minimum human intervention. The true potential of SON is contingent on the timely availability of network measurements. Therefore, a vital key enabler for SON functions is minimization of drive tests (MDT) reports. MDT reporting may include a database of MDT reports from the network. MDT reporting enables the network to instruct user equipment (UE') to log network measurements, such as reference signal received power (RSRP) and reference signal received quality (RSRQ) of serving and neighboring cells and send them back to the core through radio resource control (RRC) signaling messages thereby avoiding manual and time consuming physical drive tests as shown in Table I.

TABLE I

MDT Reported Measurements

| Measurement | Description |
|---|---|
| Location | Longitude and Latitude information |
| Serving Cell information | E-UTRAN cell global identification (ECGI) |
| RSRP | Reference Signal Received Power in dBm |
| RSRQ | Reference Signal Received Quality in dB |
| Neighboring Cell Information | Intra-frequency and Inter-frequency neighbor's RSRP/RSRQ information |

MDT supports two reporting configurations: (i) non-real time or immediate reporting, wherein when preconfigured triggers are met, the UE immediately reports the measured radio conditions; and (ii) logged mode, wherein the UE stores measurements and reports them when a periodic timer expires. When the eNB send a request to the UE for MDT reports through UEInformationRequest RRC signaling message, the UE responds back by embedding desired measurement results in UEInformationResponse RRC message and sends it back to the network. Moreover, the serving eNB tags the measurement reports with location, time and wideband channel quality indicator (CQI) information of the reporting UEs for facilitating SON algorithms.

Based on the intelligence extracted from measurements received from UEs, a SON engine initiates appropriate SON functions to achieve optimum network performance that aligns with business objectives prescribed by the operator. The information embedded in MDT reports is used by diverse SON functions such as cell outage/degradation detection, coverage hole detection, detection of excessive interference, overshoot coverage detection, mobility parameters optimization, capacity optimization, quality of service (QoS) verification, etc. Effectively, the MDT feature is a prerequisite for enabling the range of SON functions that have either already been standardized by 3GPP or being considered for future evolution of SON.

From a security perspective, however, the SON engine optimizes the network relying on the feedback information sent by the user equipment. This inherently can serve as a back door for attackers to influence the SON mechanism by sending modified/false MDT measurements within UEInformationResponse RRC messages back to the network through compromised UEs. This improvised attack, which may be referred to as a MDT attack, can pose a major challenge for the stable operation of a cellular network.

Network attacks that used to be common in the Internet are now becoming prevalent in mobile networks due to the advent of smart mobile devices and the availability of open protocol stacks. A notable example is signaling attacks and storms caused by a crafted traffic pattern that overloads the control plane and reserves network resources without actually using them. Similarly, an emerging security issue is the malicious injection of cellular signaling traffic from mobile phones. These mobile attacks can be initiated through a hijacked smartphone or through a malware resident on mobile phones. A major cause of these network attacks is rooted (fully user controlled) smartphones because rooting disables protection mechanisms of the operating system (OS), allowing the malware to use extended access privileges and for intentional malicious activity.

The current architecture of smartphones generally consists of two central processing units (CPUs), an application processor and a baseband processor. The application processor handles the user interface and runs the smartphone OS such as Android or iOS and all the applications (e.g., email client, telephone, etc.). The baseband processor handles the connectivity to the cellular network consisting of a general purpose CPU, a digital signal processor (DSP), and the necessary radio components such as a signal amplifier. The baseband processor runs a specialized real-time operating system. Cellular network stacks like long term evolution (LTE) protocols are implemented in the baseband processor.

The application processor communicates with the baseband processor through dedicated communication channel, usually a serial connection such as serial peripheral interface (SPI) or universal serial bus (USB). Over the serial connection, the application processor uses an extended version of the Hayes Attention (AT) command set to interact with the baseband.

Published attacks in literature against smartphones have focused on exploiting vulnerabilities in software running on the application processor only. Therefore, numerous countermeasures have been taken by the operating system vendors to mitigate these exploitations. On the other hand, the cellular baseband stack of most smartphones is a secluded entity that generally is not available in open source form. Given the complexity of the involved network protocols, and the fact that telephony stacks are historically old pieces of code, vulnerabilities do exist inside baseband stacks that can be exploited.

This fact has been highlighted and verified in global system for mobile communication (GSM) stacks across various models of basebands. A variety of bugs exist in the stack, each and every one of which could lead to exploits such as crashing the device, and even allowing the attacker to remotely execute code.

One exploit includes sending a mere 73 byte message to get remote code execution over the air. Another example is software unlocks written for evading the network locks of certain manufacturers phones that work by the application processor sending a special sequence of AT commands to the baseband that triggers a memory corruption vulnerability in the AT command interpreter of the baseband stack.

Reverse engineering of the baseband stacks is gaining interest. Recently, open source baseband stacks have become available for LTE, such as OpenLTE and srsLTE, that enable one to obtain a general understanding of the structure of cellular stacks. This knowledge can be helpful for binary analysis and reverse engineering of baseband stacks commonly available in the market. In some exploits, the control message contents for the LTE modem can be modified by accessing the non-volatile memory contents of the LTE modem. For example, one test validated the existence of vulnerabilities by modifying the non-volatile memory of the LTE modem and then used a service-programmer tool and AT-command tool to communicate with the device chipset. The testers were able to let the device enter sleep mode and then issued \Detach Request (power-off)" message using AT-command.

Attackers can exploit these vulnerabilities to improvise a radio access network (RAN) signaling attack. More specifically, in the context of MDT attacks identified earlier, attackers can modify the baseband stack to embed false measurements in UEInformationResponse RRC messages and send them back to the network SON engine. Even worse is that if one succeeds in modifying the protocol stack of the baseband processor then inherently the SON engine trusts whatever feedback data it receives from the registered UE in the network. Moreover, the baseband processor is usually the master processor, whereas the application processor (which runs the mobile operating system) is the slave.

If a network attacker succeeds in modifying the network stack, then there can be compromised UE's in the SON enabled network. The compromised UE's will be capable of sending customized false MDT reports back to the SON engine. The false reports can cause the SON engine to erroneously trigger a number of SON functions that can have devastating effects on network performance.

For example, attackers can falsely report very low RSRP values from areas which actually have good coverage, and thus trigger a capacity and coverage optimization (CCO) SON function in the network when and where the function is not needed, leading to an unstable network condition or forcing the network to drift into sub-optimal configuration states. Similarly, compromised UE's can report malicious reports related to handover parameters that can erroneously commence the mobility robustness optimization (MRO) SON function. The same is true for other SON functions such as mobility load balancing (MLB) and energy saving.

In general, a specially crafted coordinated attack by compromised UE's can initiate any desired SON function in the network. The unnecessary call for SON functions wastes networks resources like computational power and signaling bandwidth. On a larger scale, it can lead to sub-optimal performance of the entire network because multiple uncoordinated SON functions are subjected to a large number of potential logical, parametric or objective based conflicts that can actually degrade network performance instead of improving it.

A coordinated attack by compromised UEs can be configured such that a network never reaches an optimum, stable point, but rather the network oscillates between different states having negative affect on operating expenses and QoS.

There currently exist certain challenges. For example, as described above, measurement collection can be exploited to devise SON attacks resulting in a new dimension to security aspects in cellular networks.

SUMMARY

Based on the description above, certain challenges currently exist with false minimization of drive test (MDT) reports. Certain aspects of the present disclosure and their embodiments may provide solutions to these or other challenges. For example, particular embodiments rely on the condition that malicious/false MDT reports will differ from (i) true/honest reports from nearby reporting user equipment (UEs), (ii) target information obtained from a planning tool or simulator, and (iii) historical reports reported from the same location. In some embodiments, the network develops a historical trust on the UEs. Particular embodiments use the aforementioned factors in differentiating honest anomalous MDT reports from malicious ones.

According to some embodiments, a method performed by a network node for validating MDT reports comprises: receiving a MDT report generated by a wireless device: determining to perform validation on the received MDT report; correlating the MDT report with MDT reports from one or more wireless devices in proximity to the wireless device to determine a first correlation value; determining a trust score for the MDT report based on one or more correlation values, the one or more correlation values at least comprising the first correlation value; determining whether the trust score is below a validation threshold; and upon determining the trust score is below the validation threshold, performing a corrective action with respect to the received MDT report.

In particular embodiments, correlating the MDT report with MDT reports from one or more wireless devices in proximity to the wireless device includes comparing similarity of hardware components (e.g., same manufacturer) between the wireless device and the one or more wireless devices in proximity to the wireless device.

In particular embodiments, the method further comprises correlating the MDT report with historical MDT reports from one or more wireless devices in proximity to the wireless device to determine a second correlation value. Determining the trust score for the MDT report is further based on the second correlation value. Correlating the MDT report with historical MDT reports may include comparing similarity of hardware components between the wireless device and the one or more wireless devices in proximity to the wireless device, determining whether a network configuration has changed between a reporting time of the historical MDT reports and a reporting time of the received MDT report, determining a similarity of a weather condition at a reporting time of the historical MDT reports and a weather condition at a reporting time of the received MDT report, and/or determining a similarity of a cell load at a reporting time of the historical MDT reports and a cell load at a reporting time of the received MDT report.

In particular embodiments, the method further comprises correlating the MDT report with MDT output from a network planning tool or network simulator to determine a third correlation value. Determining the trust score for the MDT report is further based on the third correlation value.

In particular embodiments, determining the trust score comprises assigning a weight to each of the one or more correlation values. Determining the trust score may comprise exponentially averaging one or more previously determined trust scores for the wireless device.

In particular embodiments, the validation threshold is based on a category type of the wireless device.

In particular embodiments, determining to perform validation on the received MDT report comprises detecting that the MDT report includes anomalous values, detecting that the MDT report is received from a suspect wireless device, and/or receiving an indication from a network operation center.

According to some embodiments, a network node (e.g., base station, core network node, cloud node, etc.) is capable of validating MDT reports. The network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments include identification of compromised UEs that are injecting false MDT reports so that corrective action may be taken. In some embodiments, the network can prioritize an MDT dataset based on a reputation or trust score of the associated UE.

BRIEF DESCRIPTION OF THE DRAWINGS

For a more complete understanding of the disclosed embodiments and their features and advantages, reference is now made to the following description, taken in conjunction with the accompanying drawings, in which:

FIG. 3 is flowchart illustrating an example method in a network node, according to certain embodiments.

DETAILED DESCRIPTION

As described above, certain challenges currently exist with false minimization of drive test (MDT) reports. For example, attackers can falsely report incorrect measurements to trigger self optimizing network (SON) functions leading to an unstable or sub-optimal network condition.

Certain aspects of the present disclosure and their embodiments may provide solutions to these or other challenges. For example, in particular embodiments the network detects malicious/false MDT reports by comparing the report with nearby reporting user equipment (UEs), target information obtained from a planning tool or simulator, and/or historical reports reported from the same location. In some embodiments, the network develops a historical trust on the UEs.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

For a SON attack, false MDT reports can come from a registered UE along a proper channel satisfying all network security checks. Therefore, an objective of particular embodiments is to identify the malicious content through contextual analysis. On the UE side, baseband stacks may be made more secure. Complementing that at the network side includes identifying false MDT information. Particular embodiments described herein include counter measures on the network side. To detect false MDT reports, particular embodiments detect and distinguish false reports from true reports. An example is illustrated with respect to FIG. 1.

Figure 1:
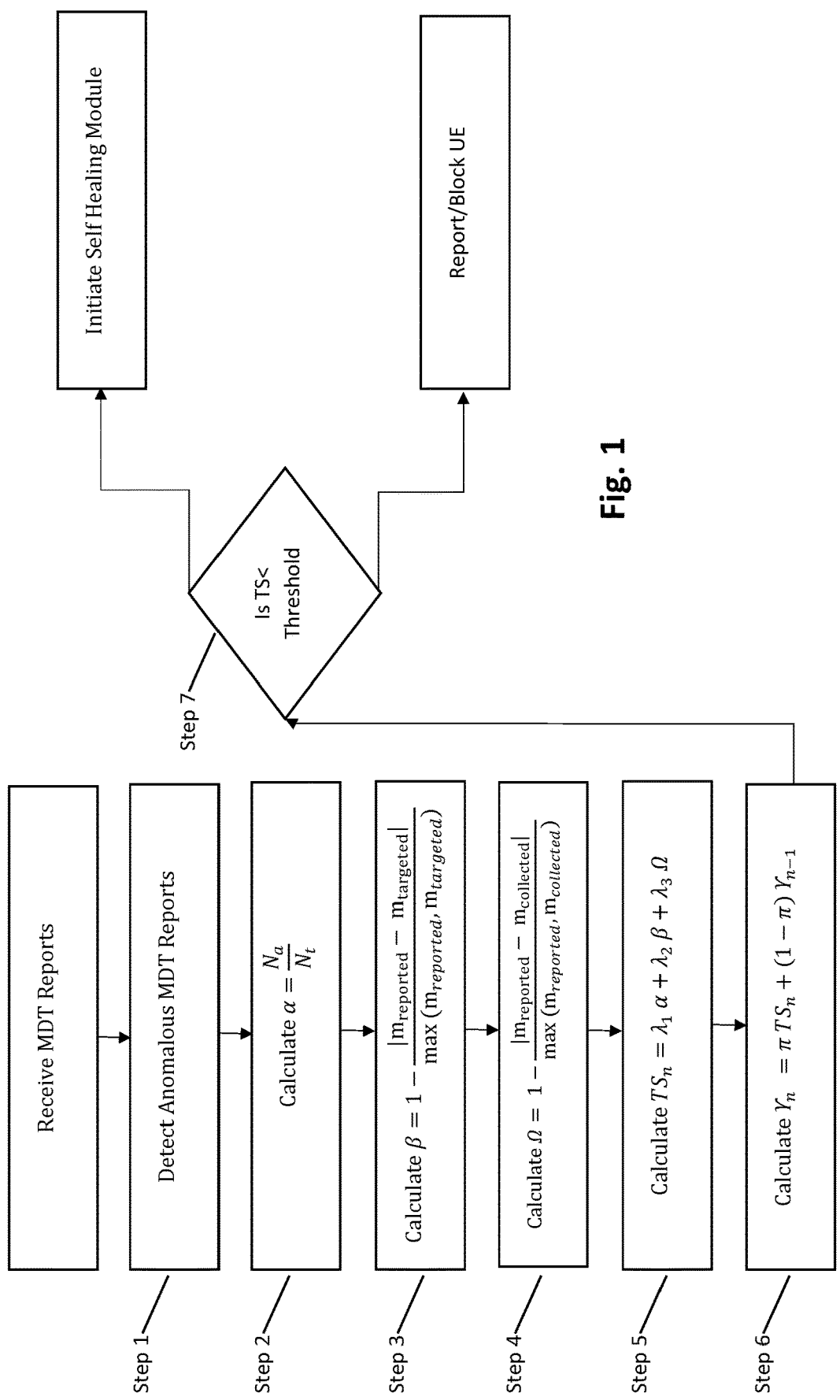
FIG. 1 is a flow diagram illustrating an example method for detecting false minimization of drive test (MDT) reports.

FIG. 1 is a flow diagram illustrating an example method for detecting false MDT reports. As an initial step, the network node receives MDT reports from one or more UEs. As described above with respect to Table I, each MDT report may include location information and one or more measurements, such as reference signal measurements, at the associated location.

In some embodiments, step 1 includes anomaly detection. For example, MDT reports are gathered from UEs and then machine learning based anomaly detection algorithms may be applied to detect anomalous reports. The anomaly detection activity may be similar to that performed by the cell outage/degradation detection (COD) SON algorithms that detect and identify anomalous MDT reports due to faulty operation of the network. The network can leverage the COD algorithms if that capability already exists in the network, otherwise a new one may be used based on existing COD modules.

Anomaly detection algorithms can use any state-of-the-art machine learning classifier such as those described in P. V. Klaine et al, "A Survey of Machine Learning Techniques Applied to Self-Organizing Cellular Networks," in IEEE Communications Surveys & Tutorials, vol. 19, no. 4, pp. 2392-2431, Fourth quarter 2017. The anomalous reports may be tagged and forwarded for filtering.

In some situations, the anomalous reports may consist of true reports due to (i) actual degradation or outages in a cell, (ii) honest anomalous reports due to faulty equipment or changes in channel, and/or (iii) false reports due to network attacks. The next task is to filter out the malicious reports from honest reports.

In some embodiments, the network node may not perform anomaly detection, but instead be instructed by another network node, such as a network node at a network operations center to evaluate a particular MDT report, MDT reports from a particular UE, MDT reports from a cell or group of cells, or any combination thereof. In some embodiments, the network node may perform anomaly detection, but only on MDT reports from the indicated UE or cell group.

At step 2, the network node calculates a factor that accounts for similarity to nearby UEs. For example, it is highly probable that the nature of false reports sent from a compromised UE will differ from the reports sent from other UEs in the same vicinity. This observation stems from the fact that the shadowing phenomenon that heavily determines MDT reported results, particularly in dense small cell environment, remains correlated over small distances that separate UEs in the same small cell. Therefore, in future dense networks dominated by small cell deployments, all UE's in the same vicinity should have correlated results. The correlation factor is calculated as follows:

$$\alpha = \frac{N_a}{N_t}$$

where $N_a$ is the number of UEs reporting anomalous MDT reports in a vicinity and $N_t$ is the total number of UEs in the vicinity served by the same base station.

At step 3, the network node calculates a factor that accounts for a similarity to target information retrieved from a radio network planning tool or simulator. For example, the planning tool or simulator can be used to emulate conditions reported in the location as reported by the UE. If the difference between the MDT measurements received from UE and the target information from the planner tool or simulator differ by certain threshold, then it may be a sign of an MDT attack. The factor is calculated as follow:

$$\beta = 1 - \frac{|m_{reported} - m_{targeted}|}{\max(m_{reported}, m_{targeted})}$$

where $m_{reported}$ and $m_{targeted}$ are reported and targeted measurements respectively. The planning tool may continue to be calibrated based on recent honest MDT reports received from the UEs.

At step 4, the network node calculates a factor accounting for similarity to historical reports collected in a bin or nearby bins. For example, the network footprint can be divided into a set of bins such that within each bin shadowing and path loss can be considered constant. In this way the network can keep MDT reports tagged to each bin in historical traces also known as channel maps. The anomalous MDT report can be compared with the average of past reports collected in that grid as follows:

$$\Omega = 1 - \frac{|m_{reported} - m_{collected}|}{\max(m_{reported}, m_{collected})}$$

where $m_{collected}$ is the historically collected measurement.

In cases where some bins might not have been visited by even a single user, calculating $\Omega$ may use the average of neighboring bins as a coverage value in an unreported bin because the shadowing phenomenon that heavily determines coverage values, particularly in a small cell environment, remains correlated over small distances that separate UEs in the same small cell.

Correlation among shadowing values can be modeled as a function of distance, given as $e^{(-d/D)}$ where d is the distance between two bins in which shadowing values are being observed. D is a constant (correlation distance) that depends on area topography. Thus, if a shadowing value in a bin in a vicinity is known, the missing shadowing value in a bin within the same vicinity can be estimated using an autocorrelation model of shadowing. Because the pathloss values in a bin are dependent on the distance traversed by the signal, coverage (which is product of shadowing and path loss) in an empty bin will be strongly dependent on coverage in neighboring bins.

Optionally, information collected from a network configuration management system may be leveraged when considering the historical reports. That is, if the configuration management system has information that some change has been made to the network (e.g., a configuration change to the serving cell of the UE or a nearby cell) which might affect the collected MDT reports compared to historical references, particular embodiments may give less weight to the historical information (see step 5). Similarly, other auxiliary information sources like weather reports (that can have high influence on mm wave and terahertz communication bands) and/or cell load can also be a criterion in determining the weight for the historical references in step 5.

At step 5, the network node calculates a trust score. For example, a trust score calculated at time period n may be calculated as follows:

$$TS_n = \lambda_1 \alpha + \lambda_2 \beta + \lambda_3 \Omega$$

where $\lambda_1$, $\lambda_2$ and $\lambda_3$ are weight coefficients that can be used to set priority of the individual factors ($\alpha$, $\beta$, $\Omega$). Some example weighting criteria were described with respect to step 4. In some embodiments, any suitable weighting may be used depending on network type and/or network or operator objectives.

At step 6, the network node may exponentially average the trust score. For example, a network node may use exponential averaging to incorporate UE's historical trust as follows:

$$Y_n = \pi TS_n + (1-\pi)Y_{n-1}$$

where $Y_n$ accounts for all trust scores from time 1 to n through exponential smoothing.

Step 7 is verification. For example, the $Y_n$ may be compared to a predefined threshold (that can be learned from historical logs). The threshold can initially be set by the domain experts and can later be optimized based on machine learning/statistical analysis. If $Y_n$ is greater than the threshold, then the report can be identified as a true report and conventional diagnosis and compensation self-healing algorithms can be executed to minimize the degradation. On the contrary, if the trust score is low (i.e., $Y_n <=$ Threshold) then it may indicate a potential SON attack and the network may block/report the flagged UEs without initiating any of the SON functions and thus saving the resources.

In some embodiments, the threshold may vary among UE types. For example, IoT devices use lower thresholds as compared to mobile phones depending upon scenarios where IoT devices are installed and managed by the network operators and thus can be considered more secure.

In some embodiments, for step 2 and 4 when similarity to nearby UEs or historical reports is checked, reports from nearby UEs and historical logs can be weighted such that more weight is given to the reports that come from UEs from the same hardware manufactures (e.g., iPhones, Samsung, Pixel, etc.).

In some embodiments, when the trust score is less than threshold, then the network can challenge the suspected UE(s) by probing/requesting for additional measurements (for which the network has an idea of the expected response) and based on that can make a final decision. In some embodiments the UE may be blacklisted and/or authorities may be notified of the identification of the suspicious UE.

In particular embodiments, the method of FIG. 1 may be executed either in the core network nodes or distributed at the edges (base stations). In some embodiments, some of the steps may be computed in the base station (e.g., step 2 because all required measurements for it are available in the base station), while the rest of the steps may be computed in the core network wherein the trace collection entity (TCE) resides, which has information for all historical MDT logs collected network wide.

Figure 2:
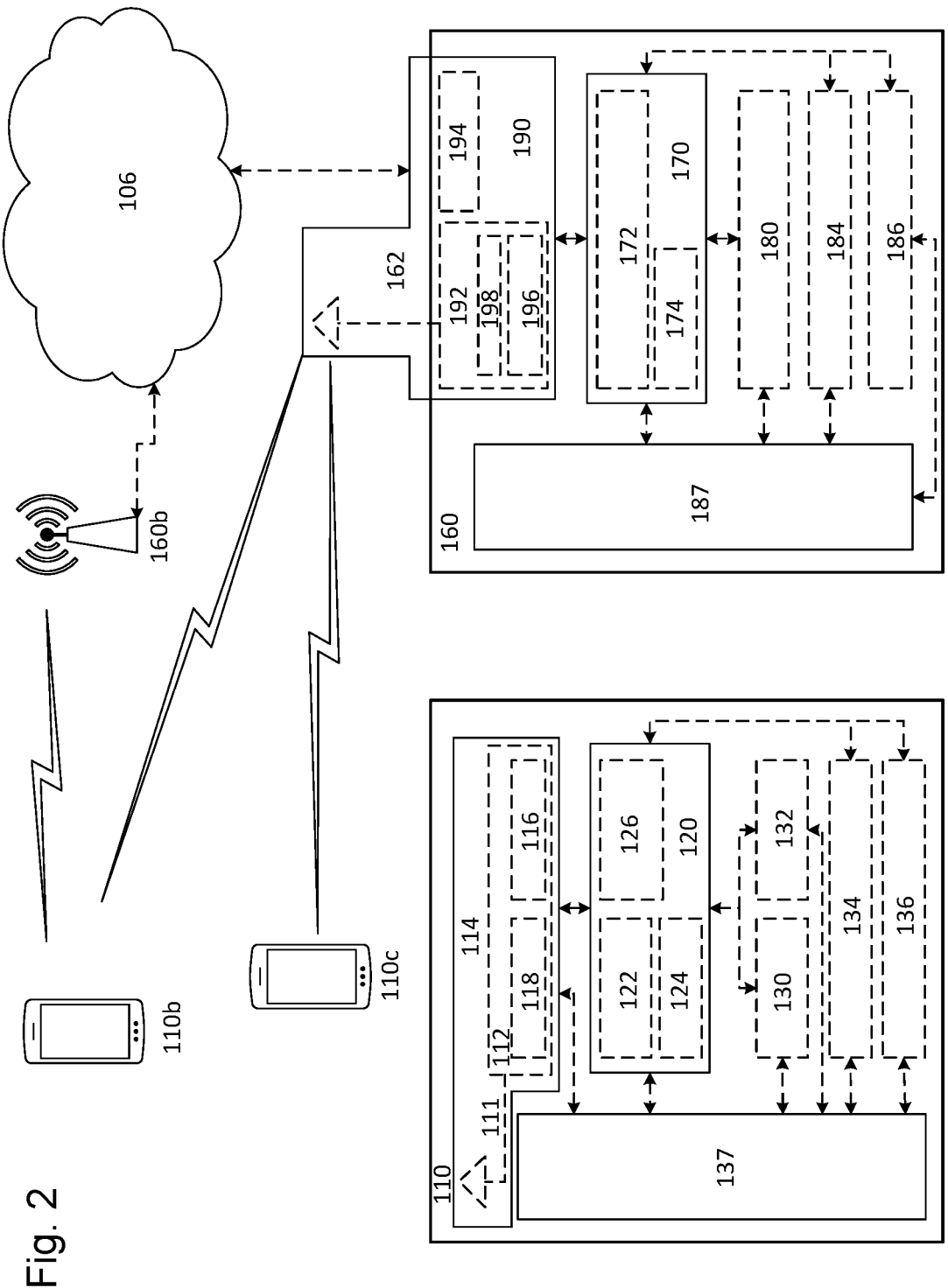
FIG. 2 is a block diagram illustrating an example wireless network.

FIG. 2 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

FIG. 3 is a flowchart illustrating an example method in a network node, according to certain embodiments. In particular embodiments, one or more steps of FIG. 3 may be performed by network node 160 described with respect to FIG. 2. The network node may comprise a base station, a core network node, a cloud network node, or any combination thereof.

The method begins at step 312, where the network node receives a MDT report generated by a wireless device. The network node may receive the MDT report directly from the wireless device, via another wireless device or network node, or retrieve the MDT report from a database of MDT reports.

At step 314, the network node determines to perform validation on the received MDT report. For example, the network node may determine the MDT report includes anomalous values according the machine learning examples described with respect to FIG. 1. In some embodiments, the network node may be instructed by a network operations center to perform validation on a particular MDT report. In some embodiments, the network node may be instructed by a network operations center to perform validation based on certain criteria, such as reports from a particular wireless device (e.g., a suspicious UE), reports from a particular cell or group of cells, or any other suitable criteria for identifying an MDT report for analysis.

At step 316, the network node correlates the MDT report with MDT reports from one or more wireless devices in proximity to the wireless device to determine a first correlation value. For example, the network node may determine a correlation value as described with respect to step 2 of FIG. 1. The general idea is to determine whether the MDT reported values are similar to or different from other MDT reported values in the vicinity.

In some embodiments, the network node may use factors in conjunction with proximity when comparing MDT reported values. For example, the network node may only compare wireless devices in the vicinity that share a similar hardware components (e.g., same device manufacturer or brand, same type of device (e.g., IoT, smart phone, etc.)).

In some embodiments, the network node may use additional correlation factors. For example, some embodiments may include steps 318 and/or 320.

At step 318, the network node may correlate the MDT report with historical MDT reports from one or more wireless devices in proximity to the wireless device to determine a second correlation value. For example, the network node may correlate the historical MDT reports as described with respect to step 4 of FIG. 1.

Similar to step 316, the network node may use factors in conjunction with proximity, such as devices with similar hardware components, when comparing with historical MDT reports. The network node may also compare conditions at a time of the historical MDT report and current conditions. For example, the network node may determine if a network configuration has changed, if a cell load is different, and/or if weather conditions are similar. Other embodiments may include any suitable criteria affecting radio transmissions.

At step 320, the network node may correlate the MDT report with MDT output from a network planning tool or network simulator to determine a third correlation value. For example, the network node may correlate the planning tool or simulator output as described with respect to step 3 of FIG. 1.

At step 322, the network node determines a trust score for the MDT report based on one or more correlation values. The one or more correlation values at least comprising the first correlation value described with respect to step 316. In some embodiments, determining the trust score may be based on additional correlation values, such as correlation value two described with respect to step 318 and the third correlation value described with respect to 320.

The network node may determine the trust score as described with respect to step 5 and/or step 6 of FIG. 1. In particular embodiments, determining the trust score comprises assigning a weight to each of the one or more correlation values, as described with respect to FIG. 1.

Determining the trust score may comprise exponentially averaging one or more previously determined trust scores for the wireless device.

At step 324, the network node determines whether the trust score is below a validation threshold. For example, the network node may perform threshold comparison as described with respect to step 7 of FIG. 1. In particular embodiments, the validation threshold is based on a category type of the wireless device. For example, IoT devices may have a different threshold than smart phones.

At step 326, the network node performs a corrective action with respect to the received MDT report. For example, the network node may simply discard the MDT report, or the network node may perform further actions, such as those described with respect to FIG. 1, such as sending additional requests to the wireless device, or notifying third parties, such as network operators or investigative agencies.

Modifications, additions, or omissions may be made to method 300 of FIG. 3. Additionally, one or more steps in the method of FIG. 3 may be performed in parallel or in any suitable order.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a network node for validating minimization of drive test (MDT) reports, the method comprising:
   receiving a MDT report generated by a wireless device;
   determining to perform validation on the received MDT report;
   correlating the MDT report with MDT reports from one or more wireless devices in proximity to the wireless device to determine a first correlation value;
   determining a trust score for the MDT report based on one or more correlation values, the one or more correlation values at least comprising the first correlation value;
   determining whether the trust score is below a validation threshold; and
   upon determining the trust score is below the validation threshold, performing a corrective action with respect to the received MDT report.

2. The method of claim 1, wherein correlating the MDT report with MDT reports from one or more wireless devices in proximity to the wireless device includes comparing similarity of hardware components between the wireless device and the one or more wireless devices in proximity to the wireless device.

3. The method of claim 1, further comprising correlating the MDT report with historical MDT reports from one or more wireless devices in proximity to the wireless device to determine a second correlation value, and wherein determining the trust score for the MDT report is further based on the second correlation value.

4. The method of claim 3, wherein correlating the MDT report with historical MDT reports from one or more wireless devices in proximity to the wireless device includes comparing similarity of hardware components between the wireless device and the one or more wireless devices in proximity to the wireless device.

5. The method of claim 3, wherein correlating the MDT report with historical MDT reports from one or more wireless devices in proximity to the wireless device includes determining whether a network configuration has changed between a reporting time of the historical MDT reports and a reporting time of the received MDT report.

6. The method of claim 3, wherein correlating the MDT report with historical MDT reports from one or more wireless devices in proximity to the wireless device includes determining a similarity of a weather condition at a reporting time of the historical MDT reports and a weather condition at a reporting time of the received MDT report.

7. The method of claim 3, wherein correlating the MDT report with historical MDT reports from one or more wireless devices in proximity to the wireless device includes determining a similarity of a cell load at a reporting time of the historical MDT reports and a cell load at a reporting time of the received MDT report.

8. The method of claim 1, further comprising correlating the MDT report with MDT output from a network planning tool or network simulator to determine a third correlation value, and wherein determining the trust score for the MDT report is further based on the third correlation value.

9. The method of claim 1, wherein the validation threshold is based on a category type of the wireless device.

10. The method of claim 1, wherein determining to perform validation on the received MDT report comprises detecting that the MDT report includes anomalous values.

11. The method of claim 1, wherein determining to perform validation on the received MDT report comprises detecting that the MDT report is received from a suspect wireless device.

12. A network node capable of validating minimization of drive test (MDT) reports, the network node comprising processing circuitry operable to:
   receive a MDT report generated by a wireless device;
   determine to perform validation on the received MDT report;
   correlate the MDT report with MDT reports from one or more wireless devices in proximity to the wireless device to determine a first correlation value;
   determining a trust score for the MDT report based on one or more correlation values, the one or more correlation values at least comprising the first correlation value;
   determine whether the trust score is below a validation threshold; and
   upon determining the trust score is below the validation threshold, perform a corrective action with respect to the MDT report.

13. The network node of claim 12, wherein the processing circuitry is operable to correlate the MDT report with MDT reports from one or more wireless devices in proximity to the wireless device by comparing similarity of hardware components between the wireless device and the one or more wireless devices in proximity to the wireless device.

14. The network node of claim 12, the processing circuitry further operable to correlate the MDT report with historical MDT reports from one or more wireless devices in proximity to the wireless device to determine a second correlation value, and wherein the processing circuitry is operable to determine the trust score for the MDT report further based on the second correlation value.

15. The network node of claim 14, wherein the processing circuitry is operable to correlate the MDT report with historical MDT reports from one or more wireless devices in proximity to the wireless device by comparing similarity of hardware components between the wireless device and the one or more wireless devices in proximity to the wireless device.

16. The network node of any one of claim 14, wherein the processing circuitry is operable to correlate the MDT report with historical MDT reports from one or more wireless devices in proximity to the wireless device by determining whether a network configuration has changed between a reporting time of the historical MDT reports and a reporting time of the received MDT report.

17. The network node of claim 14, wherein the processing circuitry is operable to correlate the MDT report with historical MDT reports from one or more wireless devices in proximity to the wireless device by determining a similarity of a weather condition at a reporting time of the historical MDT reports and a weather condition at a reporting time of the received MDT report.

18. The network node of claim 14, wherein the processing circuitry is operable to correlate the MDT report with historical MDT reports from one or more wireless devices in proximity to the wireless device by determining a similarity of a cell load at a reporting time of the historical MDT reports and a cell load at a reporting time of the received MDT report.

19. The network node of claim 12, the processing circuitry further operable to correlate the MDT report with MDT output from a network planning tool or network simulator to determine a third correlation value, and wherein the processing circuitry is operable to determine the trust score for the MDT report further based on the third correlation value.

20. The network node of claim 12, wherein the validation threshold is based on a category type of the wireless device.

21. The network node of claim 12, wherein the processing circuitry is operable to determine to perform validation on the received MDT report by detecting that the MDT report includes anomalous values.

22. The network node of claim 12, wherein the processing circuitry is operable to determine to perform validation on the received MDT report by detecting that the MDT report is received from a suspect wireless device.

* * * * *